Jan. 14, 1958  S. M. SERON  2,819,650
SPECTACLE HOLDER
Filed March 22, 1952
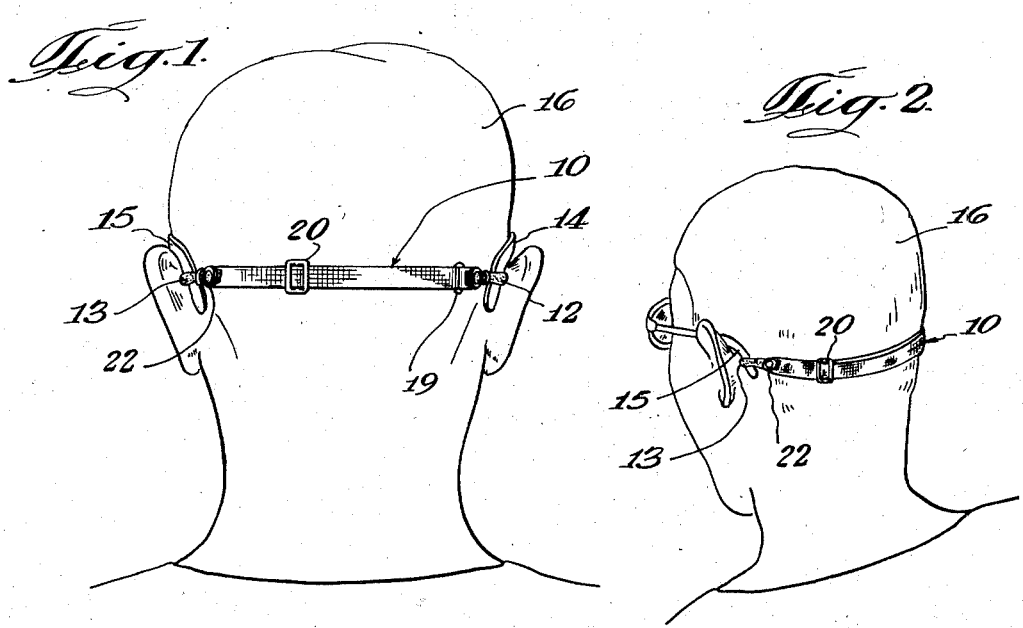
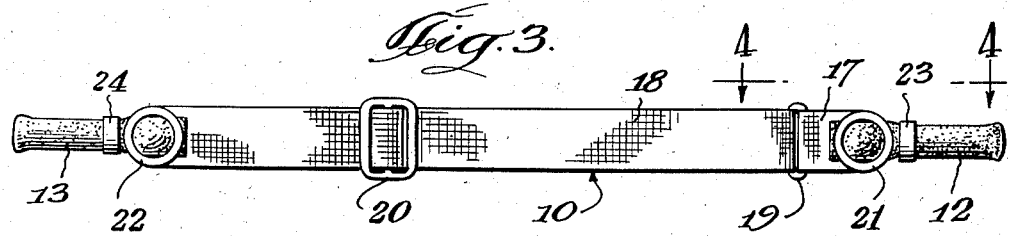
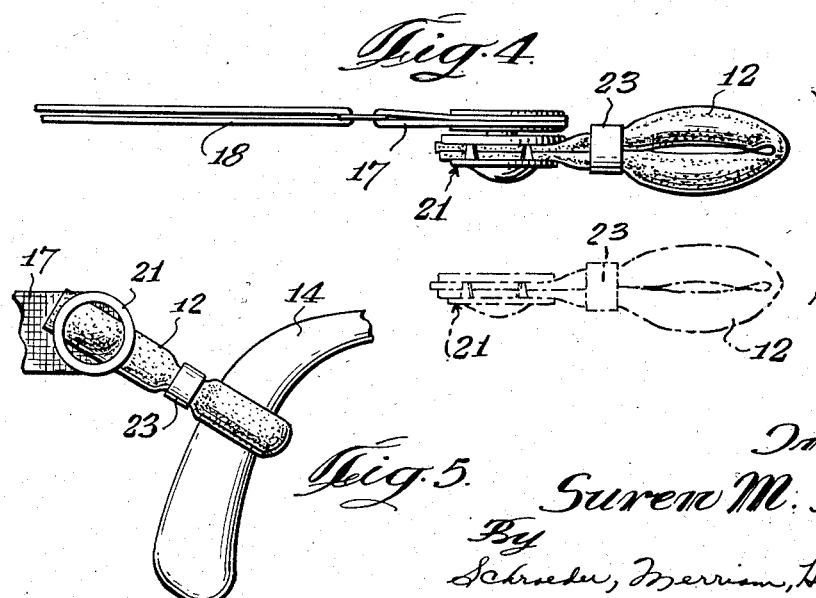
Inventor
Suren M. Seron
By
Schroeder, Merriam, Hofgren & Brady
Attorneys United States Patent Office 2,819,650
Patented Jan. 14, 1958

2,819,650

SPECTACLE HOLDER

Suren M. Seron, Joliet, Ill.

Application March 22, 1952, Serial No. 277,948

2 Claims. (Cl. 88—51)

This invention relates to a spectacle holder and more particularly to an improved device for securing a pair of spectacles to the head of the wearer.

People who must wear spectacles to aid their vision have long been handicapped when participating in active sports, such as basket ball, tennis, baseball or the like, or otherwise being particularly active physically, as in sailing, climbing and the like. Spectacles are easily knocked off and also have an annoying habit of sliding down on the wearer's nose, or dropping off completely. I have devised and am herein disclosing and claiming an improved device for securing a pair of spectacles to the head of the wearer.

It is desirable, economically and practically, that a device such as this should be adapted for universal use. That is, that it should be adjustable in order that it may be used by anyone regardless of the size of his head. Furthermore, as there are innumerable styles of spectacles in common use today, the securing device should be adapted to function properly with any of them.

One object of this invention is to provide an improved device for securing a pair of spectacles to the head of the wearer. Another object is to provide such a device which is adjustable to fit the individual wearer's head. A further object is to provide such a device which may be used with any type of spectacles. Yet another object is to provide such a device which may be used with ordinary spectacles without the need of providing special means for attachment.

Further objects and advantages of my invention will appear from the specification and from the drawings, of which:

Fig. 1 is a rear view of the head of a person showing a spectacle securing device made according to my invention in use;

Fig. 2 is a rear perspective view of the head shown in Fig. 1;

Fig. 3 is a side elevational view of a spectacle securing device made according to my invention;

Fig. 4 is a view taken as shown by the line 4—4 of Fig. 3; and

Fig. 5 is a side view of a portion of the device showing details of construction.

In the embodiment of my invention shown in the drawings, the securing device consists of an adjustable elongated member indicated generally as 10, preferably of an elastic material and adapted to encircle a portion of the rear of the head of the wearer. At each end of the elongated member are affixed adjustable spectacle gripping members 12 and 13. As shown in Figs. 1 and 2, the ends 14 and 15 of the temples or bows of a pair of spectacles are engaged by the gripping members 12 and 13 and the elongated member 10 extends about the rear of the head 16 of the wearer securing the spectacles in place, so that they cannot be knocked off or slide down on the wearer's nose.

The elongated member 10 consists of a first looped portion 17 joined to a second looped portion 18 by means of a link 19. The length of the second portion 18 is adjusted by means of a metal slide 20 to which one end of the second portion is affixed. Thus the length of the elongated member may be varied and the device adapted to fit heads of various sizes.

The spectacle gripping members 12 and 13 are preferably swivelly and detachably affixed at either end of the elongated member as by the snap fasteners 21 and 22 shown in the drawings. The gripping members are made of an elastic material having a high coefficient of friction. I have found rubber tubing of one-eighth of an inch to three-sixteenths of an inch in diameter to be satisfactory and desirable for this purpose. The gripping members are formed in a loop and the ends thereof are secured to one member of the snap fastener as shown in Figs. 4 and 5. Rings 23 and 24 are slidably movable on the loops 12 and 13 respectively to vary the effective size thereof in order that the device may be used with various types of spectacle bows.

The bows or temples of spectacles are made in a variety of shapes and sizes. Some are of a narrow diameter wire and partially encircle the ear of the wearer. Others may be of plastic as large as a half an inch or more in width and extend horizontally back along the side of the wearer's head. There are countless forms in between these two extremes. Since the effective size of the gripping members 12 and 13 may be varied, the device may be used with spectacles having bows of any size. Furthermore, by swivelly connecting the gripper members 12 and 13 to the elongated member 10, the device is adapted for use with all kinds of bows regardless of the angle at which they pass the ear. The gripping members 12 and 13 will assume a position according to the angle of the end of the bow, while the elongated member will lie flat around the head of the wearer.

It is often desirable to remove a pair of spectacles to clean moisture or dirt from the lenses. Especially is this so when the wearer is physically active, since the lenses are then particularly liable to become fogged. With my invention the spectacles may be removed and replaced on the head of the wearer while the securing device is attached. For example, this may be done by merely sliding the metal slide 20 on the elastic to lengthen it and slipping the entire assembly over the top of the head.

If one of the gripping members 12 and 13 should wear out or break, it may be replaced by unsnapping the defective gripper and replacing it with a new one. It is not necessary that the user buy a complete new device.

While I have shown and described certain embodiments of my invention, it is to be understood that it is capable of many modifications. Changes, therefore, in the construction and arrangement may be made without departing from the spirit and scope of the invention as disclosed in the appended claims.

I claim:

1. A spectacle holder of the character described for retaining spectacles having a pair of temples on the head of a wearer, comprising: a narrow elongated band of elastic material having means for adjusting its effective length to encircle a portion of the rear of the wearer's head; a first member of a snap fastener secured to each end of said band; a pair of spectacle temple gripping members adapted to grip the rear portion of the temple adjacent the wearer's ears, each including a loop of elastic rubber material having the second member of said snap fasteners secured to the ends of the loop for detachably securing the gripping members to the ends of the band; and a ring disposed about the two side portions of each of said loops for sliding movement toward and away from the closed end thereof to tighten the loops about said temples.

2. A spectacle holder of the character described for retaining spectacles having a pair of temples on the head of the wearer, comprising: a narrow elongated band yieldable in length to encircle a portion of the rear of the wearer's head in engagement therewith; swivel fastening means secured to each end of said band; a pair of spectacle temple gripping members adapted to grip the rear portion of the temple rearwardly of the wearer's ears, each including a loop of elastic rubber material having a high coefficient of friction and having said fastening means secured to the ends of the loop for attaching the gripping members to the ends of said elongated band and permitting the gripping members to swivel in the plane of the band; and a ring disposed about the two side portions of each of said loops for sliding movement toward and away from the closed end thereof to tighten the loops about said temples.

References Cited in the file of this patent

UNITED STATES PATENTS

| | | |
|---|---|---|
| 1,666,017 | Lininger | Apr. 10, 1928 |
| 1,782,057 | Bollinger | Nov. 18, 1930 |
| 1,894,888 | Ponton | Jan. 17, 1933 |
| 1,897,090 | Walding | Feb. 14, 1933 |
| 2,023,523 | Grimball | Dec. 10, 1935 |
| 2,249,572 | Lieber | July 15, 1941 |
| 2,264,351 | Willson | Dec. 2, 1941 |
| 2,499,140 | Griffith | Feb. 28, 1950 |
| 2,541,493 | Barroso | Feb. 13, 1951 |
| 2,649,020 | Wheeler | Aug. 18, 1953 |